United States Patent [19]

Foster et al.

[11] 4,069,412
[45] * Jan. 17, 1978

[54] AREA NAVIGATION SYSTEM

[75] Inventors: George B. Foster, Worthington; Paul Douglas Gibbs, Blacklick, both of Ohio

[73] Assignee: Air Data, Inc., Worthington, Ohio

[*] Notice: The portion of the term of this patent subsequent to Dec. 17, 1994, has been disclaimed.

[21] Appl. No.: 476,513

[22] Filed: June 5, 1974

[51] Int. Cl.² .............................................. G06G 7/78
[52] U.S. Cl. .................................. 364/448; 343/6 R; 343/106 R; 364/451; 364/571; 364/575
[58] Field of Search ...................... 235/150.26, 150.27, 235/186, 190; 328/155; 307/262; 343/106 R, 6 R

[56] References Cited

U.S. PATENT DOCUMENTS

| 3,680,118 | 7/1972 | Anthony | 343/106 R |
| 3,778,602 | 12/1973 | Schmitt | 235/150.27 |
| 3,796,867 | 3/1974 | Abnett et al. | 235/150.27 |
| 3,803,611 | 4/1974 | Becker, Jr. | 343/106 R |
| 3,831,010 | 8/1974 | Games et al. | 235/150.27 |

Primary Examiner—Felix D. Gruber
Attorney, Agent, or Firm—Anthony D. Cennamo

[57] ABSTRACT

There is disclosed an area navigation system including signal averaging and lag compensation circuits to overcome VOR signal propagation instabilities and a meter sensitivity control circuit which decreases the sensitivity of a track angle deviation left-right needle display as the aircraft approaches a waypoint. Means are also provided for digitally displaying the aircraft bearing to the waypoint.

18 Claims, 9 Drawing Figures

AREA NAVIGATION SYSTEM

INTRODUCTION AND BACKGROUND

This invention relates to area navigation systems, and more particularly to an area navigation system having improved accuracy in the presentation of course deviation information. The invention is described in the particular context of the area navigation systems described and claimed in Assignee's Abnett et al U.S. Pat. No. 3,796,867 entitled, "ANGLE MODE AREA NAVIGATION COMPUTER", and in Assignee's Bean U.S. Pat. No. 3,750,942 entitled, "DISTANCE MODE AREA NAVIGATION COMPUTER", the disclosures of which patents are incorporated herein to the extent pertinent.

An extended description of the concepts of area navigation and its many advantages is set forth in the Abnett et al and Bean patents, and the reader is referred to these patents for more information. Briefly, however, there exists a network of navigation aids called VORTAC's which provide ratio information from which range and bearing information may be derived. In area navigation, the VORTAC range and bearing data are used in conjunction with an arbitrarily selected range and bearing from the VORTAC to a so-called waypoint. From these, an on-board computer generates range and bearing data from the aircraft to the waypoint. Because the location of a waypoint is arbitrary within the range of a particular VORTAC, the pilot is no longer constrained to fly along or near the established airways (defined with respect to a series of VORTAC stations). Instead, one may fly along any convenient course simply by appropriate choice of waypoints. In broad terms, area navigation systems such as those of the Bean and Abnett et al patents facilitate the above by solving a vector triangle defined by the aircraft, the VORTAC, and the waypoint, given the selected waypoint address vector and the measured aircraft to VORTAC vector.

In the Abnett et al patent, there is shown an area navigation system in which the aircraft to waypoint vector is used to generate a display of range from the aircraft to the waypoint, and a track angle deviation display, the latter is based on the difference between the actual aircraft to waypoint bearing (the angle component of the aircraft to waypoint vector) and the bearing at which it is desired that the aircraft intercepts the waypoint, i.e. the selected track angle. The angle display is advantageously accomplished by means of a "left-right" needle included in the course deviation indicator (or CDI) of the standard VORTAC navigation systems.

In the Bean patent, track deviation is displayed on a left-right meter as distance from the selected track.

Each of the aforementioned types of systems has particular advantages, as described in the respective patents. In both instances, however, one of the most important factors in assuring accurate and useful system operation (apart from good system design) is overcoming a track deviation display instability due to radio propagation defects associated with the VORTAC station, and corresponding errors inherent in the mathematical formulation of the data, and the display mode required for the track error.

BRIEF DESCRIPTION OF THE INVENTION

A principal cause of display instability is the propagation characteristics of the data transmitted by the VORTAC. This data is transmitted on a carrier in the 100 mHz range which is amplitude modulated by a 9660 Hz subcarrier carrying a 30 Hz frequency modulation as a bearing reference. The main carrier is also modulated by a 30 Hz variable phase signal from which bearing measurements are derived. The phase variation is produced by rotation of the VORTAC transmitting antenna and this, combined with propagation effects such as multi-path reflection, etc. and inherent transmitter instability results in a corresponding instability in the VORTAC data received in the aircarft. This ultimately manifests itself in a left-right needle display instability commonly called "scalloping" and effects area navigation as well as VOR navigation.

Also in area navigation if a waypoint is selected close to a VORTAC, the zone of uncertainty caused by the antenna lobe pattern creates further instability. Moreover, since the track deviation display is based on vector addition of the VORTAC to waypoint and aircraft to VORTAC vectors it will be appreciated that as the waypoint is approached, and the waypoint to aircraft range approaches zero, the bearing to the waypoint display becomes more sensitive to small errors. This is particularly true in the angle mode system of the Abnett et al patent in which the total distance deviation represented by the left-right meter becomes progressively smaller as the waypoint is approached. Even when effects of scalloping are not severe, accurate passage over the waypoint based on the left-right needle commands can be quite difficult.

The existence of the radio propagation effects causing scalloping have been recognized by workers in the field of area navigation system design and several attempts have been made to overcome the problem. For example, in one available system, the computed value of the aircraft to waypoint vector is subject to a long time constant averaging process but experience with the system has indicated that the result is not satisfactory in overcoming the effects of scalloping. Another available system provides averaging operation of a somewhat different type, but in use is found to be so highly sensitive to rapid changes in the aircraft to VORTAC bearing that operation close to a VORTAC is highly unsatisfactory. This could be a serious problem where it is necessary to define the location of a waypoint relatively close to a VORTAC, for example, if a VORTAC station is located close to an airport and the runway approach path is defined by a waypoint.

Of equal importance, in the latter system, display sensitivity is found to increase rather than to decrease as the aircraft approaches the waypoint, further aggravating the already excessive needle deviations as the aircraft to waypoint range approaches zero.

These problems have, of course, been recognized and dealt with in the systems of the Bean and Abnett et al patents. The present invention, however, yields further improvement and increases display stability and accuracy to the extent that the problem is negligible.

In accordance with the present invention, there is provided means for decreasing the display sensitivity in a programmed fashion as the aircraft approaches a waypoint. The effect is to increase the total angular deviation corresponding to a full scale meter deflection and the total cross-track distance represented by the full scale reading. By properly selecting the manner in which the course width sensitivity is changed, a substantial improvement is effected in the display stability as the waypoint is approached.

With regard to the propagation characteristics of the VOR transmitter, the incoming VORTAC distance and range data is subjected to a particular averaging technique, and is thereafter subject to a lag compensation to overcome the effects of the averaging operation. By selecting the amount of lag compensation in accordance with a measured rate of change of the bearing to the VORTAC, the net phase error introduced by the averaging process is eliminated.

The above described averaging process is particularly important with respect to the bearing data derived from the VORTAC signal, but inherent instabilities in the range component of the VORTAC signal are also eliminated by a similar averaging technique and lag compensation.

An additional feature of the invention is the provision of a digital display of the waypoint to aircraft bearing. As will be recalled, particularly in the area navigation system of the Abnett et al patent, course deviation information is displayed by means of a left-right needle on the standard CDI. This information is quantitative in the sense that the pilot knows that the standard meter sensitivity is plus or minus ten degrees. However, since the course sensitivity control causes an increased full scale angular deviation as the waypoint is approached, it will be appreciated that the quantitative nature of the display varies in a fashion which is not readily interpreted by the pilot. Thus, it is advantageous to provide in addition a direct numerical display of the aircraft to waypoint bearing, and such display represents an additional feature of the present invention.

Accordingly, it is among the objects of the present invention to provide:

An improved area navigation system;

An area navigation system having improved display stability;

An area navigation system having reduced sensitivity to VORTAC radio propagation errors;

An area navigation system having reduced sensitivity to small track deviation errors close to a waypoint;

An area navigation system which selectively provides a digital display of the aircraft to waypoint bearing in conjunctin with the standard left-right needle display;

An area navigation system using a standard course deviation indicator to display angular rack deviation in which the left-right meter sensitivity is controlled as a function of the aircraft to waypoint range;

An area navigation system in which a standard CDI is used to display track angle deviation and in which the CDI sensitivity is decreased in a programmed manner beginning at a selected range from a waypoint, and reaching a preset value when the aircraft intercepts the waypoint;

An area navigation system in which the received VORTAC data is subjected to a time averaging process to reduce the effect of inherent radio propagation errors; and An area navigation system in which the time averaging of the incoming VORTAC data is combined with lag compensation in accordance with the rate of change of the incoming data such that the net phase error induced by the averaging process is negligible.

The exact nature of the invention, as well as other objects and advantages thereof will become apparent from consideration of the following detailed description in conjunction with the drawings, in which.

Figure 3:
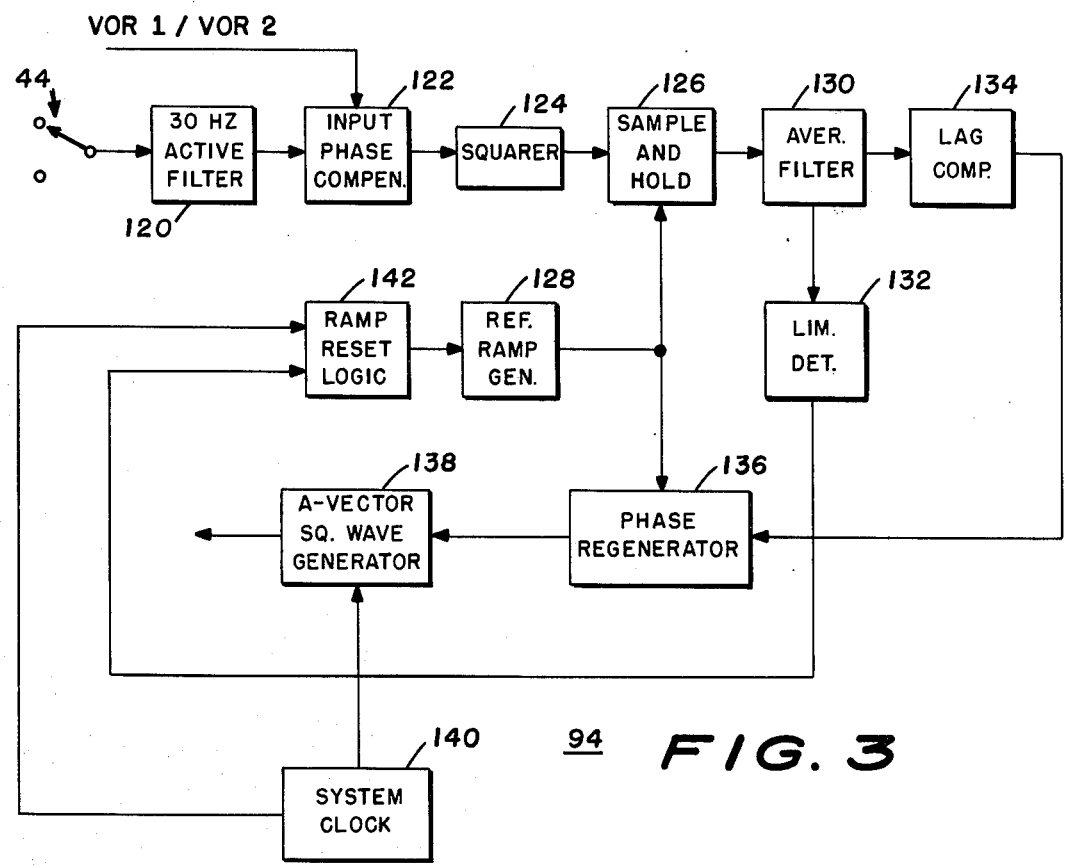
FIG. 3 is a block diagram of the A-vector phase averaging and lag compensation circuit.
Figure 2:
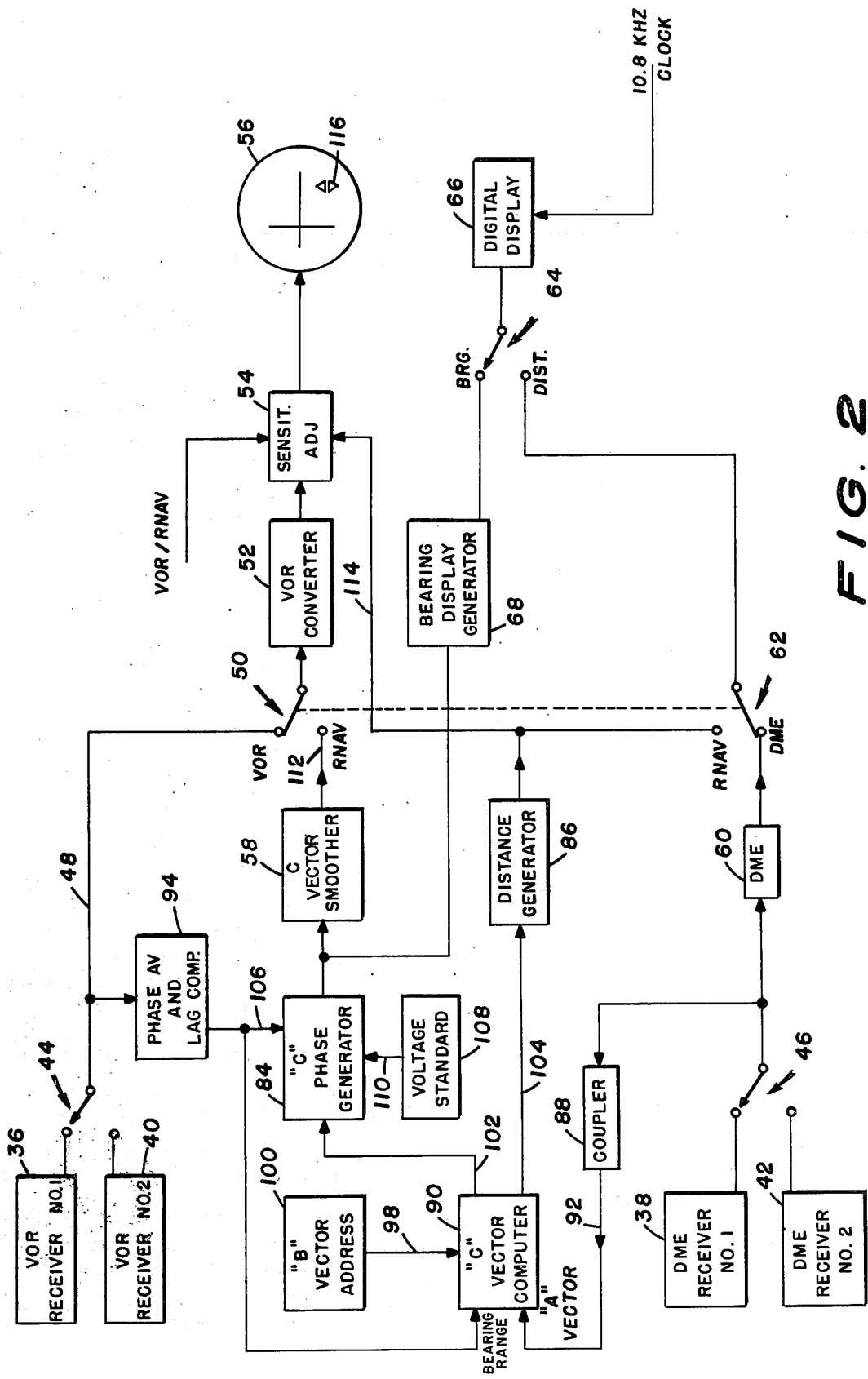
FIG. 2 is a simplified block diagram of the system of the present invention, shown in the context of an angle mode area navigation system.
Figure 4:
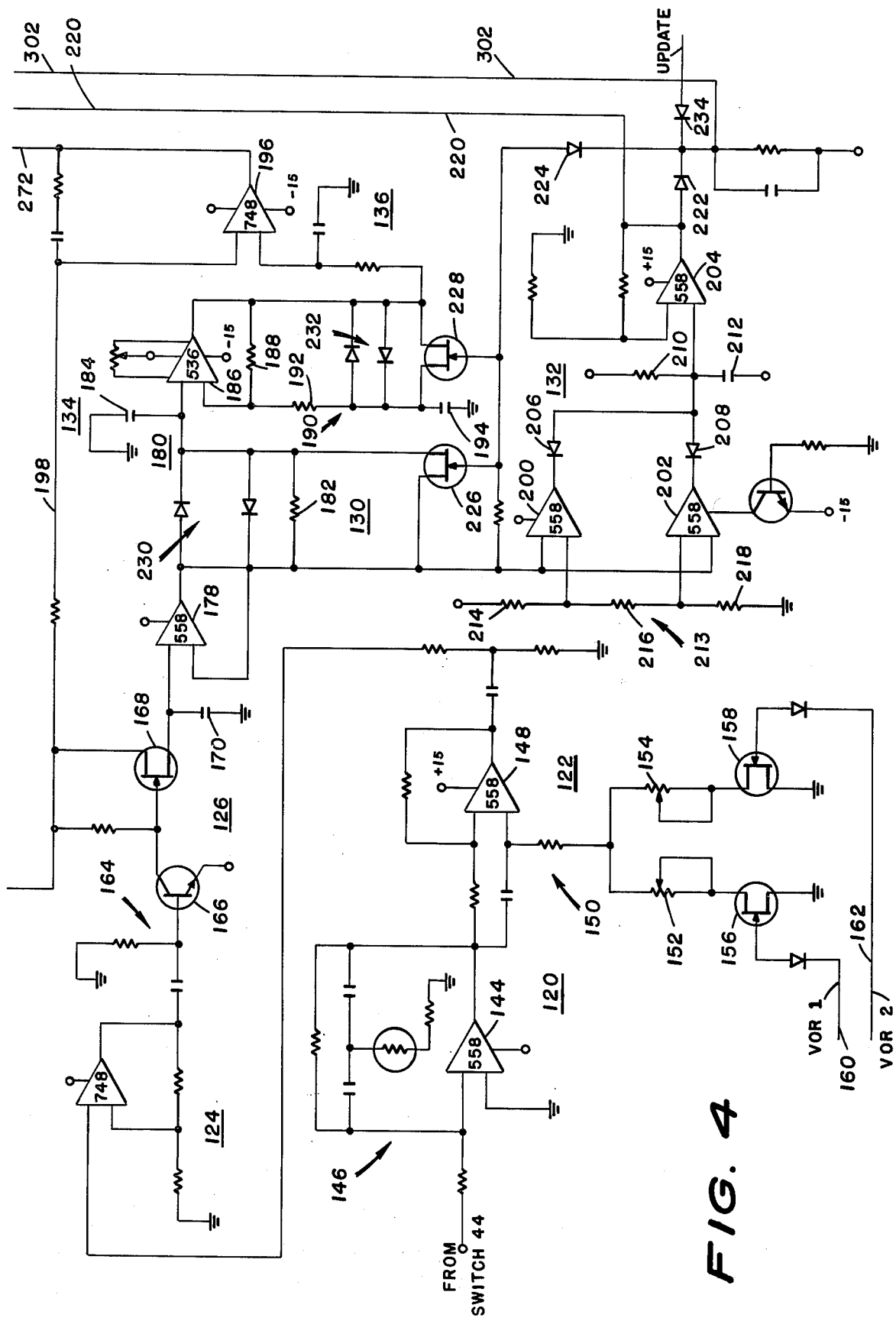
Figures 5, 6:
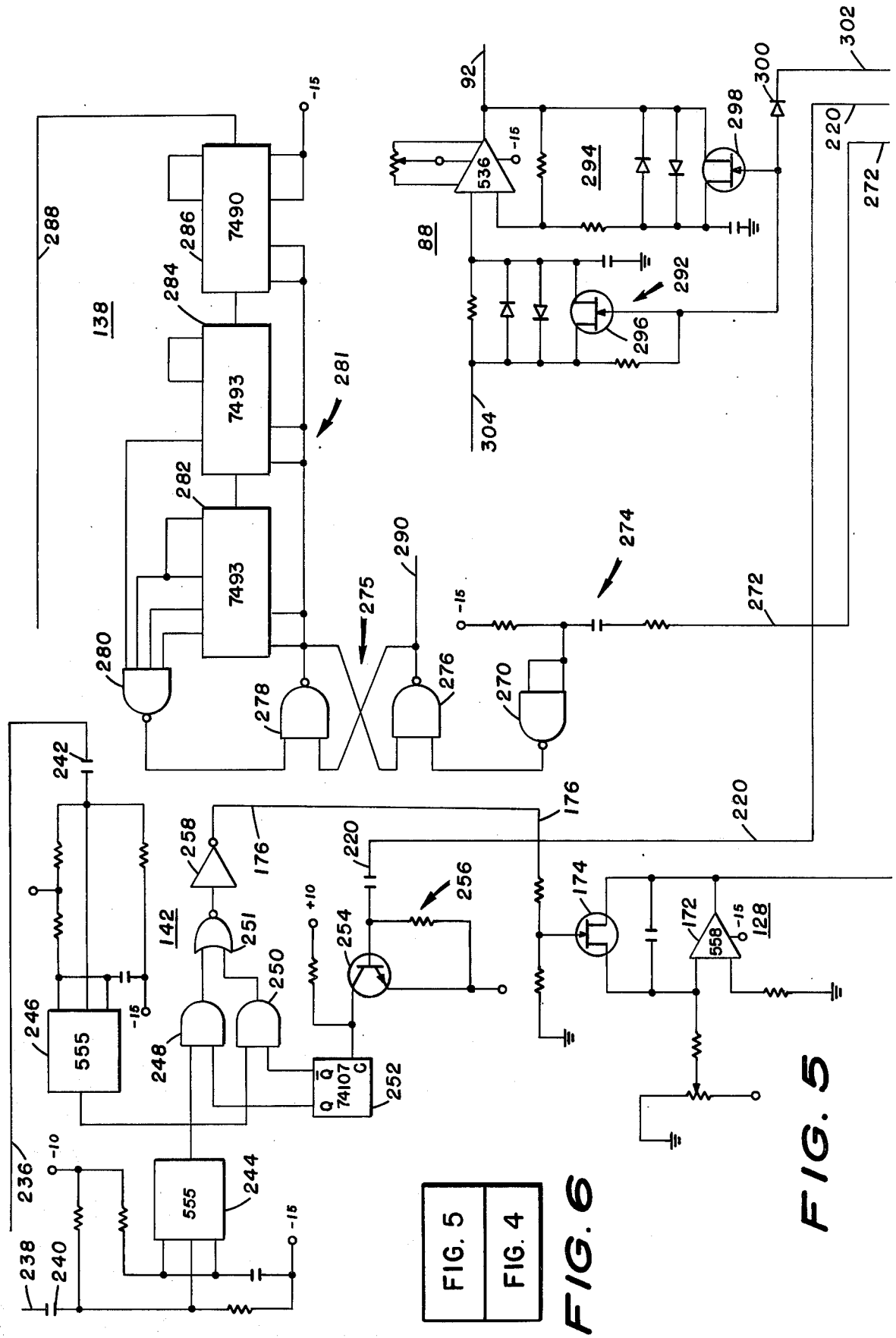
Figure 7:
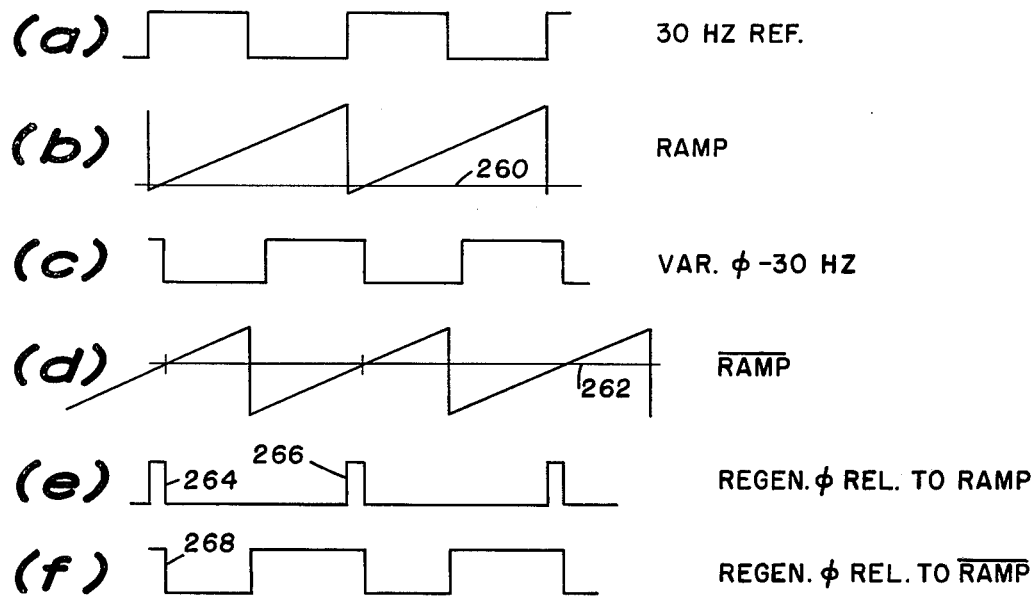
Figure 8:
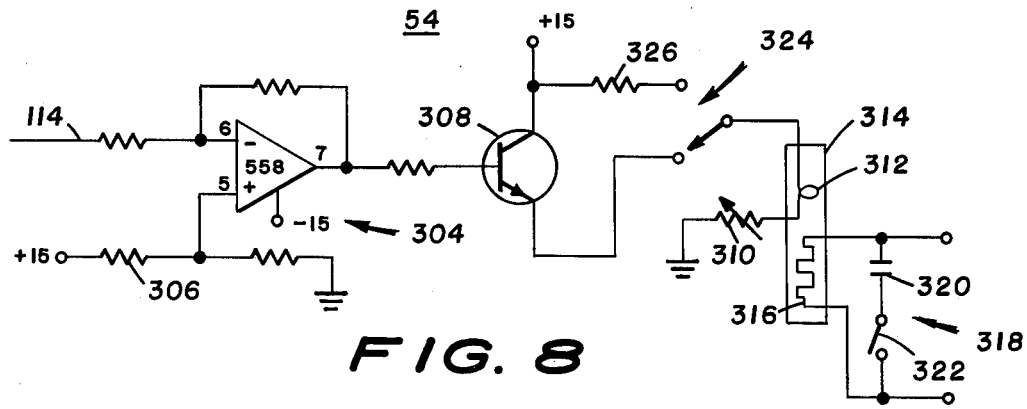

FIGS. 4 and 5 arranged as indicated in FIG. 6 show a circuit diagram for a preferred embodiment of the phase averaging and lag compensation circuit of FIG. 3, as well as the construction of the DME coupler shown in FIG. 2;

FIG. 7 is a waveform diagram useful in understanding the operation of the circuit of FIGS. 4 and 5;

FIG. 8 is a schematic diagram of the meter sensitivity control circuit; and

Figure 9:
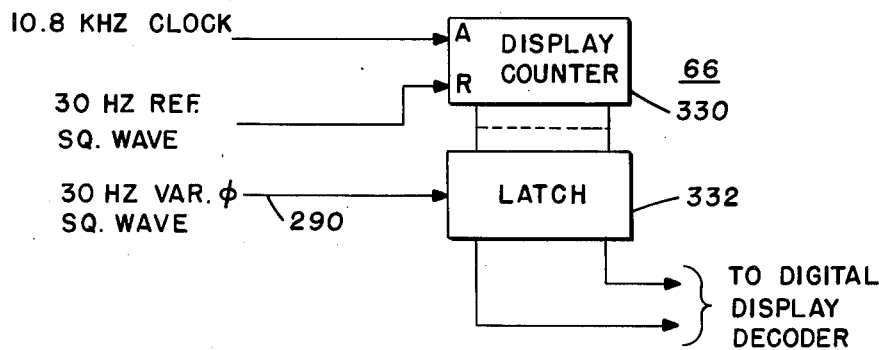

FIG. 9 is a simplified block diagram showing an implementation of the digital bearing display.

DETAILED DESCRIPTION OF INVENTION

In the following detailed description of the present invention, the novel features are disclosed in the context of the system shown in the Abnett et al patent since the CDI sensitivity control is of particular value in the track angle deviation mode of operation. It should be recognized, however, that the VORTAC signal averaging techniques and the bearing to waypoint display techniques herein disclosed are directly and advantageously applied in both the Abnett et al and Bean systems, as well as in area navigation systems of any other type. Thus, while the disclosure is in the specific context of the Abnett et al system, it should not be regarded as so limited.

Figure 1:
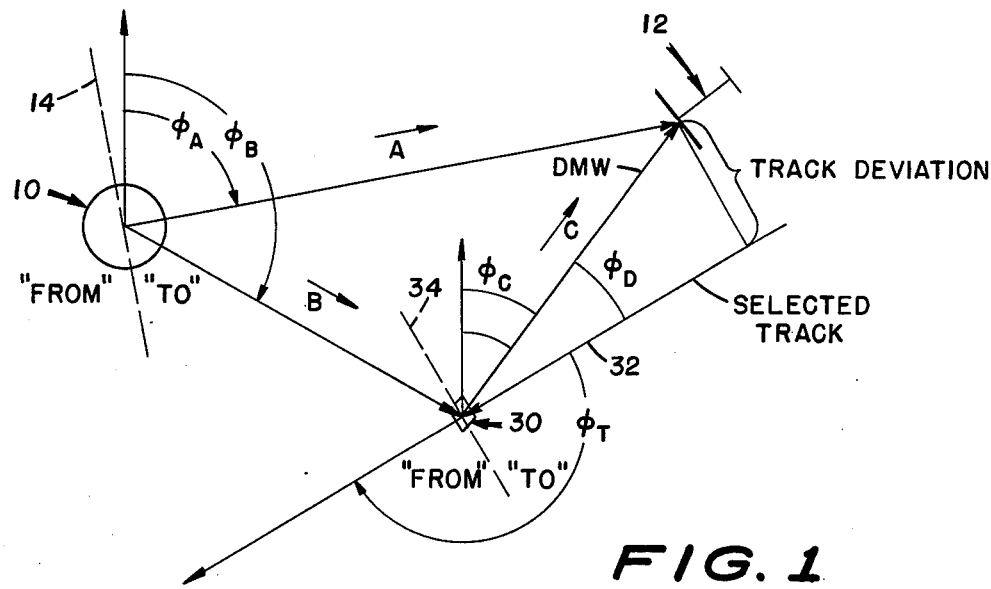
FIG. 1 is a vector diagram useful in understanding the basic concepts of area navigation.

Turning first to FIG. 1, there is shown a vector diagram useful in the better understanding of the concepts of this invention. Shown is a VORTAC station 10 and an aircraft 12 located in an arbitrary position with respect to station 10. The aircraft position is ordinarily defined in terms of a vector A having a magnitude A and an azimuth or bearing (with respect to North) of $\phi_A$. In conventional VOR navigation the magnitude A and the angle $\phi_A$ are computed, and utilized to locate the aircraft relative to the VORTAC and relative to a selected course, i.e., a desired bearing toward the VORTAC. A "left-right" course deviation indicator (CDI) provides a measure of how many degrees to the left or right the aircraft bearing must be changed to intercept the desired course. A "to-from" indicator is normally provided as a part of the course deviation indicator. The "to" indication is given if the course deviation angle (i.e., desired bearing minus actual bearing) is within plus or minus 90°. The "from" indication is given if the course deviation angle is more than 90° or less than 90°. The dashed line 14 in FIG. 1 represents the "to-from" boundary assuming vector A in fact to be the selected course.

For area navigation the pilot establishes a succession of arbitrary landmarks, such as that denoted 30, and commonly called waypoints. Waypoint 30 has a known bearing $\phi_B$ and a range B with respect to a VORTAC such as 10 in its vicinity, thereby defining the vector B from the VORTAC to the waypoint. The triangle defined by vectors A and B includes a third side C defining an azimuth angle $\phi_C$ and a range C of the aircraft with respect to the waypoint. Since the components of the vector A are determined by the incoming VORTAC data, and since the components of the vector B may be determined for a selected waypoint from a suitable navigational chart, the C vector can be determined by the vector subtraction A − B. Once this is done, the navigator using an area navigation system may treat the vector C in precisely the same manner as the navigator using standard VORTAC techniques would treat the vector A.

In particular, a selected track 32, analogous to the "selected course" mentioned above, may be defined as the desired bearing of the aircraft as it approaches the waypoint, and a track deviation angle $\phi_D$ computed as the difference between the actual bearing of the aircraft from the waypoint (180°+$\phi_C$) and its desired bearing $\phi_T$ on the selected track, i.e., $\phi_D = 180° + \phi_T - \phi_C$. The computed range C is displayed as a distance to the waypoint on an appropriate indicator and the bearing $\phi_D$ is displayed on the conventional CDI. As in conventional VOR navigation a "to-from" indicator is used to show whether the aircraft is more or less 90° off the selected track. (See line 34 in FIG. 1.)

FIG. 2 illustrates in schematic form, the essentials of an angle mode area navigation system of the general type disclosed in the Abnett et al patent, and in which the improvements of this invention are of particular utility.

Data from which the A-Vector is generated, consisting of separate bearing and range components are received respectively by means of a VOR receiver 36, and a DME receiver 38. Typically, a second VOR receiver 40, and a second DME receiver 42 are may also be present, and are taken advantage of in the present system by using one VOR-DME channel for area navigation operation with the second VOR-DME channel being utilized to supply data for a standard instrument landing system (ILS). To accomplish receiver channel selection, there are provided a pair of mechanically interconnected two-position switches 44 and 46. Suitable phase and amplitude compensation as necessary to match the characteristics of the respective receivers are provided as herinafter described.

VOR and DME receivers 36 through 42 are of conventional construction, and are often present in the aircraft for normal VORTAC navigation before the area navigation system is installed. For present purposes, it should simply be noted that the Tactical Air Navigation (TACAN) portion of the VORTAC station includes a transponder which processes a pulse signal from the aircraft DME receiver and returns a signal indicating the distance from the VORTAC station. At the same time, the VHF Omni-directional Range (VOR) portion of the VORTAC station transmits an amplitude and frequency modulation signal from which the bearing information is derived. The VOR signal has a carrier frequency in the 108–117.95 mHz band, and includes a composite signal, commonly referred to as the VOR video. This comprises a 30 Hz sine wave of variable phase (depending on the rotation of the VOR antenna) and a 9960 Hz subcarrier, frequency modulated at 30 Hz to provide a reference phase (zero degree reference) for the VOR video. When the aircraft is due north of the VORTAC station, the two 30 Hz sine waves are exactly in phase. The phase difference between the variable phase signal and the zero degree reference is used to determine the aircraft bearing.

Switch 44 is connected by way of lead 48 to the VOR terminal of a selection switch 50. When this switch is in the VOR position, the VOR video is supplied directly to a conventional VOR converter 52 and then through a sensitivity adjustment circuit 54 (and then) to the standard course deviation indicator (CDI) 56. A VOR/RNAV selection signal activates sensitivity adjustment 54 during the RNAV mode of operation, as explained below. DME channel selection switch 46 is connected to DME processing circuit 60 for use during conventional VORTAC navigation and to a DME coupler 88 for RNAV operation. The output of processing circuit 60 is connected to the DME position of another switch 62 by which the VORTAC range or the waypoint range from the RNAV system is selected. A further switch 64, described below, connects the range data at the distance (DIST.) terminal to a suitable display unit 66. This is advantageously a digital display of any conventional or desired construction, including a counter, latches, etc. A 10.8 KHz clock is used to operate the counter since this frequency corresponds to 360 cycles during the period of the 30 Hz reference component of the VOR video and allows each count to represent 1°.

The second position of switch 64 is designated bearing (BRG). This allows the utilization of display unit 66 to provide a digital indication of the bearing of the aircraft to the waypoint. For this purpose, there is provided a bearing display generator unit 68 described in more detail below. As will be appreciated, when switch 64 is in the DIST. position, the information displayed is either the DME information, or th RNAV distance information, depending upon the position of switch 62.

Assuming that switch 64 is in the DIST. position, during RNAV operation, the VOR converter 52 is connected to the output of a C-Vector phase generator 84, while display unit 66 is connected to the output of a distance generator unit 86. The range component of the A-Vector is provided through a DME coupler unit 88 to the range input of C-Vector computer 90, while the bearing component of the A-Vector is supplied through a phase averaging and lag compensation circuit 94 described in detail below, to the bearing input of C-Vector computer 90.

The B-Vector is supplied to computer 90 by means of lead 98 from a waypoint address selector unit 100. Using available navigation charts, the pilot manually sets the waypoint address selector unit 100 to the necessary range and bearing for the B-Vector. The construction and operation of waypoint address selector unit 100 is preferably of the type shown and described in the aforementioned Bean patent, and provides a 30 Hz sine wave having a magnitude proportional to B and a phase relative to the zero° reference representative of $\phi_B$.

Computer 90 produces a pair of output signals on leads 102 and 104, both of which are 30 Hz sine waves having magnitude proportion to C and a phase relative to the zero degree reference indicative of $\phi_C$. The signal is supplied over lead 104 to the distance generator 86 and over lead 102 to the input of the C phase generator 84. In addition to the C-Vector signal, C phase generator 84 also receives VOR video signal through phase averaging and lag compensation circuit 94 and a DC reference voltage from a voltage standard source 108 by way of lead 110. The C-Vector on lead 102 is normalized, i.e., given a constant amplitude, in C phase generator 84 in conjunction with the reference voltage from source 108. This signal is then additively combined in the C phase generator with a portion of the 9960 Hz component of the VOR video to produce a reconstructed VOR video signal at its output on lead 112. This is in all respects identical to the original VOR video with the exception that the phase of the additive 30 Hz component is (not) representative of the phase of C-Vector, i.e., $\phi_C$ rather and $\phi_A$. This reconstructed composite video is provided through a C-Vector smoother 58 to the RNAV terminal of switch 50 and to the bearing display generator for ultimate display by means of CDI 56 and digital display unit 66.

FIG. 3 shows a block diagram of the phase averaging and lag compensation circuit 94 which operates to eliminate the effects of scalloping caused by the incoming VOR signal. As illustrated, the output of VOR receiver selection switch 44 is coupled through a 30 Hz active filter 120. This removes the 9960 subcarrier and its 30 Hz F.M. from the VOR video signal and provides the 30 Hz variable phase component of the VOR signal to an input phase compensation network 122. A VOR 1/VOR 2 selection signal activates an appropriate compensation circuit to match the phase characteristics of the two VOR receivers.

The output of phase compensation network 122 is coupled to a squarer such as a saturating amplifier which converts the 30 Hz variable phase sine wave into a square wave. A sample and hold circuit 126 responds to one of the square wave transitions (say the positive to negative transition) to sample the output of a 30 Hz reference ramp generator circuit 128 and to provide the same, essentially as a DC level to the input of averaging filter 130. The latter provides one output to a limit detector circuit 132, described below, and another to a lag compensation network 134.

The lag compensation network is coupled to a phase regenerator circuit 136 which receives as a second input, the output of ramp generator 128. Regenerator 136 is essentially a comparator which produces a variable duty cycle pluse train, the leading edge of each cycle being coincident with the time when the averaged and lag compensated DC voltage and the ramp voltage are equal. The output of Regenerator 136 is coupled to an A-Vector square wave generator 138 which operates in conjunction with a system clock 140 to recreate a square wave having the same phase as the average value of output of squarer 124, and not subject to the time instability which is the cause to the scalloping. System clock 140 is also coupled to a ramp reset logic circuit 142 which receives as its second input, the output of limit detector 132 to provide the reset for the reference ramp generator 128. The purpose of limit sensor 132 is to determine when the ramp is sampled so close to its upper or lower edge that the time instability can cause inadvertant sampling on the wrong side of the ramp transition. Operation of the limit sensor causes the ramp reset to be shifted 180° whereby the sample is removed from the transition time.

Referring now to FIGS. 4 and 5, arranged as indicated in FIG. 6, there is shown an implementation of a preferred embodiment of the phase averaging and lag compensation circuit of FIG. 3. As illustrated, the input from switch 44 is provided through 30 Hz active filter 120, comprising an operational amplifier 144 and an appropriate feedback network 146.

Input phase compensation network 122 comprises an operational amplifier 148 and an RC network 150 having a pair of adjustable resistors 152 and 154 set to match the internal phase shifts of the VOR receivers. Respective field effect transistors 156 and 158, controlled by a selection signal for VOR 1 or VOR 2 over one of leads 160 and 162 are activated to establish a current path through one of resistors 152 and 154. This allows appropriate compensation for phase shifts in the two VOR receivers before further processing.

The compensated variable phase output of circuit 122 is coupled through squarer 124 and thence to an RC differentiating network 164 which is coupled to the base of a transistor 166. The negative transition of the square wave through differentiator 164 turns off transistor 166. This turns on a field effect transistor 168 which is coupled in series with a capacitor 170 to the output of reference ramp generator 128 (see FIG. 5). Ramp generator 128 is simply an integrating amplifier 172 with capacitive feedback, connected to a constant voltage source at its input pin 2. A field effect transistor 174 shunts the feedback path to discharge the capacitor at a 30 Hz rate under control of a reset signal provided over lead 176 from the ramp reset logic unit 142 hereinafter described. At the beginning of each negative half cycle of the variable phase square wave, the value of the ramp is sampled, and that value is stored on capacitor 170.

Averaging filter 130 includes an input voltage follower 178 and a long time constant RC network 180 consisting of a resistor 182 and a capacitor 184. The values of resistor 182 and capacitor 184 are so selected as to produce a time constant of approximately 25 seconds. This totally eliminates the effect of short term time instabilities in the A-Vector phase component due to propagation characteristics of the VOR signal.

The averaging technique used is quite effective, but it introduces a significant error for a non-zero rate of change of the A-Vector phase component. This may be understood by recognizing that for small phase changes, (negligible), successive samples produce only small variation of the voltage across sample and hold capacitor 170, and correspondingly little or no current flow through averaging resistor 182. On the other hand, where the radial rate of change of the A-Vector is large, e.g., if the aircraft is flying at right angles to the A-Vector, then the voltage across capacitor 170 may change significantly from sample to sample resulting in substantial current flow through averaging resistor 182. This current flow results in a phase lag which is a function of both the rate of change and the time constant of the averaging circuit. For a time constant sufficient to achieve effective averaging, say ten seconds or more, the resulting errors can be quite substantial. For example, at a speed of 180 knots, a ten second time constant results in a lag error corresponding to one-half mile when flying at right angles to the A-Vector.

In accordance with the present invention, the foregoing problem is overcome by the utilization of a feed forward lag compensation network which introduces a phase lead sufficient to overcome the lag introduced by the rate of change of the A-Vector phase component. Compensation circuit 134 comprises an FET input voltage follower 186 with a resistive feedback path 188 and an RC Shunt circuit 190 comprising a resistor 192 and a capacitor 194.

To understand the operation of the lag compensation circuit, note that with resistor 188 a short circuit, and RC network 190 absent, amplifier 186 is simply a high input impedance voltage follower. Even with a relatively large value of resistor 188, voltage follower operation continues because of the high input impedance caused by the field effect transistor. Assume now that capacitor 194 is present. For flight at 90° to the A-Vector, it will be appreciated that the rate of change of the A-Vector phase component is constant and thus the voltage appearing at pin 7 of input amplifier 178 is a linear ramp. (Description in terms of a constant rate of change is simpler, and indeed, a straight forward lag compensation network is not totally affective where the rate of change is not constant. However, it has been found that the resulting error is not significant.) With a constant rate of change at the output of amplifier 178, there is a constant current flow through resistor 182. This is reflected at the output of amplifier 186, and because of capacitor 194, there is developed a feedback current in resistor 188 and a corresponding voltage across the resistor of opposite sense to that across resistor 1822. By selecting the values of resistors 182 and 188 to be equal, and capacitors 184 and 194 to be equal it may be seen that the voltage which results across resistor 188 is equal and opposite to that across resistor 182, exactly compensating for the phase lag introduced by the averaging filter.

If resistor 192 is absent, there is a very rapid compensation for the phase error resulting from current flow through resistor 182. However, it is found that the rapid compensation results in extreme circuit instability. Thus, it is advantageous to include resistor 192 to slow down the onset of compensation. The value is selected as a compromise between the desired rapid onset of compensation (and resulting instability) and slower but more stable operation. In practice, it is found that making resistor 192 equal to resistors 182 and 188 is a good compromise. By way of example, capacitors 184 and 184 are advantageously five microfarads while resistors 182, 188, and 192 are 4.7 megohms, yielding a time constant of slightly less than 25 seconds.

As will be appreciated, the output of amplifier 186 is a slowly varrying DC level representing the average phase difference between the variable phase 30 Hz signal, and the reference ramp, which is either in phase with or, as explained below, 180° out of phase with the 30 Hz reference component of the VOR signal. However, while the variable phase signal may be subject to substantial time instability due to the propagation effect previously mentioned, the long time constant and the lag compensation results in total elimination of this instability.

There now remains only to reconvert DC level into a square wave having the same phase relative to the reference channel as the average value of the original variable phase signal. This is accomplished by coupling the output of amplifier 186 to one input of a phase regenerator circuit 136 which comprises an amplifier 196, the second input to which is provided over lead 198 by the input of reference ramp generator 128. Whenever the value of the ramp exceeds that of the DC level at the output of amplifier 186, amplifier 196 operates and the voltage at its output goes low. Amplifier 196 remains operative until the ramp is reset at the end of its cycle. The result is a wave form having its negative going edge coincident in time with the average value of the (original) variable phase input from switch 44. This negative going transition is then converted into a square wave by A-Vector square wave generator 138 hereinafter described.

Referring still to FIG. 4, note that the signal which controls the sampling of the ramp, i.e., the unaveraged signal is subject to the unwanted time instability. Thus, the sample time may be uncertain from cycle to cycle, and the voltage appearing on capacitor 170 may vary irrespective of the actual changes of the A-Vector phase component. If the average value is close to the minimum or maximum value of the ramp, a slight instability may result in the ramp being sampled at, say 355° during one cycle, and at 5° during the next cycle. Thus for an actual phase difference close to zero, it may be seen that two successive samples would produce an average phase of 180°.

To avoid this error, there is employed the limit sensing circuitry 132 in combination with the ramp reset logic 142. Limit sensor 132 is comprised of a pair of comparator amplifiers 200 and 202 and a third amplifier 204 operating as a timing circuit in conjunction with a pair of diodes 206 and 208, a resistor 210 and a capacitor 212 the latter providing a time constant of one second. A voltage divider 213 comprising resistors 214, 216 and 218 provides reference inputs for comparators 200 and 202. The values are so selected that amplifier 200 operates when the sampled value of the ramp at pin 2 exceeds the reference value at pin 3. Similarily, a comparator 202 operates when the value of the ramp appearing at pin 5 falls below the reference value at pin 6.

When one of amplifiers 200 or 202 operates, its output drops low and a current path exists through the associated diode 206 or 208 to discharge capacitor 212. As the capacitor discharges, there is a low to high transition at the output of amplifier 204. This is coupled over lead 220 as the control input to ramp reset logic unit 142 and causes a 180° shift of the ramp reset time. The next sample of the ramp is thus not near the limit established by voltage divider 213, and the activated one of comparators 200 and 202 turn off, and the associated diode is blocked. At that time, capacitor 212 commences to charge through resistor 210. At the zero crossing amplifier 204 turns off, and its output again goes low.

The aforementioned time lag before amplifier 204 turns off permits a rapid update of the voltages across capacitors 184 and 194 in the averaging and lag compensation networks. For this purpose, the output of amplifier 204 is coupled by a pair of diodes 222 and 224 to the gate inputs of field effect transistors 226 and 228, respectively shunting resistors 182 and resistors 188 and 192. Field effect transistors 226 and 228 are operative while the output of amplifier 204 is high. Thus, for the interval determined by the time constant of resistor 210 and capacitor 212, capacitors 184 and 194 are allowed to charge rapidly to the new value resulting from change in reset time of the reference ramp.

An additional fast update capability is provided by a pair of oppositely poled diodes 230 shunting resistor 182, and a second pair of oppositely poled diodes 232 shunting resistors 188 and 192. These operate, for example, in the event that the system is tuned to a new VOR frequency with very substantial difference in phase. Also, an external fast update signal is provided by a diode 234 which serves to activate field effect transistors 226 and 228 in the same manner as amplifier 204.

Referring now to FIG. 5, it was previously mentioned that the positive going transistion at the output of amplifier 204 is coupled over lead 220 as the control input to the ramp reset logic circuit 142. Two additional inputs for logic circuit 142 are provided on leads 236 and 238. These are derived by a phase locked loop from the 30 Hz frequency modulation of the 9660 Hz subcarrier. The signals on leads 236 and 238 are square waves of complementary phase and are provided respectively through RC differentiating networks 240 and 242 as triggering inputs to mono-stable multi-vibrators 244 and 246. Mono's 244 and 246 are thus triggered 180° out of phase but keyed to the zero degree phase reference. The outputs of mono's 244 and 246 are coupled to respective AND gates 248 and 250, seconds inputs to which are provided by the complementary outputs of a set-reset flip-flop 252. This, in turn, is controlled by a transistor 254 which receives a signal on lead 220 through a differentiating network 256. AND gates 248 and 250 are coupled through a NOR gate 251, and an inverter 258 over lead 176 to reset the ramp generator. Thus, depending on the state of flip-flop 252, one of AND gates 248 or 250 is activated, and the ramp-generator 128 is reset by each succeeding cycle of the zero degree reference — either at 0° or at 180°.

When either the upper or lower limit of limit sensor 132 is reached, the negative to positive transition at the output of amplifier 204 causes flip-flop 252 to be complemented, thereby activating the other of AND gates 248 and 250 from that previously activated. Ramp generator 128 is thereafter reset 180° out of phase from its previous reset time.

With reference to FIG. 7, it may be seen that the resulting shift in the ramp reset time has no effect on the ultimate phase of the output of phase regenerator circuit 136. In line (a) of FIG. 7, there is shown the 30 Hz reference square wave and in line (b) a ramp reset by the negative to positive transition of the reference. In line (c), there is shown a variable phase 30 Hz signal having a positive to negative transition very close to the reset time of the ramp. In line (b), the DC level 260 represents the sample value of the ramp which would appear on capacitor 170 in FIG. 4.

Assuming that this level is sufficiently close to the limits to trigger limit detector circuit 132, a new ramp is generated as shown in line (d) of FIG. 7 which is reset by the positive to negative transition of the 30 Hz reference signal in line (a). As before, the positive to negative transition of the variable phase 30 Hz signal samples the ramp, but now, as indicated by the DC level 262 the ramp is not sampled near its upper or lower limits.

Lines (e) and (f) of FIG. 7 show the result of the phase regeneration by means of comparator amplifier 196 in FIG. 4. In line (e), it may be seen that when the ramp of line (b) reaches the value corresponding to DC level 260, there is a positive to negative transition 264 at the output of comparator 196, and the output remains low until the ramp is reset. The comparator output then goes high as shown at 266. Correspondingly, in line (f) when the value of the ramp in line (d) reaches the DC level 262, there is a positive to negative transition at the output of amplifier 196, denoted 268. Comparing lines (e) and (f), it may be seen that transitions 264 and 266 are exactly coincident, irrespective of the ramp reset time.

The remaining portion of the circuit shown in FIG. 5 is the A VECTOR square wave generator 138. This circuit comprises a NAND gate 270 operating as an inverter coupled to the output of amplifier 196 through lead 272 and a differentiating network 274. Another two NAND gates 276 and 278 are cross-coupled to provide a latch circuit 279, one input to which is provided by NAND gate 270 and the other input to which is provided by another NAND gate 280 hereinafter described.

Square wave generator 138 also includes a counter chain 281 comprised of three decade counters 282, 284, and 286, advanced by a 108 kHz clock signal appearing on lead 288. Latch circuit 275 is coupled to the reset inputs (pins 2 and 3) of counters 282 through 286 thereby activating the counters only when the latch is triggered by NAND gate 270.

NAND gate 280 is connected to decode the 1800 count output of counter chain 281. As will be recalled, the system clock frequency of 108 kHz provides 3600 cycles during the period of a 30 Hz square wave. Each cycle of the clock, therefore, represents one-tenth of one degree and 1800 cycles represent exactly 180°.

When the 1800 count is reached, NAND gate 280 operates and resets latch circuit 279, ending the counting cycle after exactly one-half of a 30 Hz period. As a result, there is generated a 30Hz square wave beginning with positive to negative transition of the output of amplifier 196. The latch output appearing on lead 288 is in fact a square wave in phase coincidence with the average value of the A-VECTOR phase component.

In FIG. 5, there is also illustrated the construction of a smoothing circuit contained in DME coupler 88. The circuit comprises a time averaging network 292, and a lag compensation network 294 identical to respective circuits 130 and 186 in phase circuit 94. Fast update capability is provided by field effect transistors 296 and 298 under control of diode 300. This is connected by means of lead 302 to the junction of diodes 222, 224, and 234 to operate the fast update capabilities of the DME smoother in the same fashion as the phase circuit. The input is provided over lead 304 from selection switch 46 while the output is provided on lead 92 to the C-VECTOR computer 90 (see FIG. 2).

It will be appreciated that the DME smoother differs from the phase smoother in that no ramp generator is present, since the DME signal is a voltage level and it is not necessary to convert from a square wave to a voltage level for the averaging process.

Referring back to FIG. 2, the "C-Vector" smoother 58 serves essentially the same purpose as the phase averaging and lag compensation circuit 94, and includes identical sample and hold, ramp generator, reset control, averaging, lag compensation, limit sensing, and phase regenerator circuits. As to the regeneration of the output square wave, the accuracy (to 0.1°) required for the A-VECTOR phase component is not required for the C-VECTOR phase component since the ultimate display requires accuracy of only 1.0°. Thus, instead of using a counting chain for regeneration of the square wave, a triggerable mono-stable having a period equal to one-half that of a 30 Hz square wave is employed. Circuit operation, including the 180° phase shift of the ramp reset when the sample value reaches preset limits, is identical to that of phase averaging and lag compensation unit 94 but the time constant employed in the averaging circuit is about one second.

The purpose of "C-VECTOR" smoother 58 is to assure that the transition of to-from flag 116 on CDI 56 from "to" to "from" at the waypoint is not subject to oscillation. Any instability of the C-VECTOR phase which would tend to make the flag oscillate is eliminated by the additional smoothing. The "C-VECTOR smoother" 58 also provides additional stabilization of the left/right needle presentation on the CDI 56.

In FIG. 8, there is shown a simplified schematic diagram of the sensitivity adjustment circuit 54. Basically, this serves to place a controllable shunt across the CDI meter 56 in accordance with the distance from the waypoint to control the meter sensitivity. For this purpose, the output of distance generator 86 (see FIG. 2) is provided over lead 114 to input pin 6 of a threshold amplifier circuit 304. A reference voltage is provided at pin 5 by a voltage divider 306. Amplifier 304 is biased to a level corresponding to a distance of approximately three miles. Thus, when the input at pin 6 drops below the level corresponding to a distance of three miles, the amplifier output on pin 7 goes positive.

The output of amplifier 304 at pin 7 is resistance coupled to the base of an emitter follower transistor 308, whereby the current flow through the transistor depends on the voltage on lead 114. The current path for transistor 308 is connected by a variable resistor 310 to ground, and through the filament 312 of a light dependent resistor (LDR) 314. As will be appreciated, increasing current flow through filament 312 causes a decrease in the value of a resistance element 316 in LDR 314. As the current flow through transistor 308 increases, the value of the resistance at output terminals 318 becomes progressively smaller. Thus, the signal on lead 114, representing the range of the aircraft to the waypoint controls the resistance at terminals 318.

Output terminals 318 are coupled across the input terminals of the left-right meter in CDI 56 to progressively reduce the meter sensitivity as the waypoint is approached. A smoothing capacitor 320 may also be arranged to shunt the meter by means of a switch 322.

As will be noted, the filament of LDR 314 is coupled through the movable contact of a switch 324. In the position shown, switch 324 provides a current path through transistor 308. When the switch is in the other position, however, it is connected directly to a supply voltage through a resistor 326. A particularly advantageous selection of the value of resistor 326 produces a meter sensitivity of plus or minus 30° coursewidth at full scale. In that case, at the moment the meter needle comes off the pin (i.e. at the time that the course deviation is exactly 30° in one direction) there exists a 30-60-90° right triangle in which the leg opposite the 30° angle is the actual distance to the selected track and the hypotenuse represents the actual distance to the waypoint. Because of the 30-60-90° relationship, the distance to the selected track is equal to one-half the distance to the waypoint.

Thus, if the aircraft is in a landing approach, for example, and the pilot is proceeding toward an intercept for the selected track representing the landing approach, the left-right meter may be observed and when it comes off the pin, the distance to the waypoint may be read from display 66 (see FIG. 2) to give the distance until the selected track is intercepted. Switch 324 is activated during a landing approach and the above explained advantageous fixed sensitivity employed.

FIG. 9 shows in simplified block diagram form, the means for effecting a digital display of the bearing to the waypoint, i.e. the phase component of the C-VECTOR. To accomplish this, the counter-latch-decoder circuit included in digital display unit 66 is allowed to operate during the interval between the leading edge of the C-VECTOR phase component and the leading edge of the 30 Hz reference square wave. This is illustrated in FIG. 9, wherein digital display unit 66 is shown to include a display counter 330 having its reset input provided by the 30 Hz reference square wave, and a latch circuit 332 activated by 30 Hz variable phase square wave providing over lead 290 from the output of phase averaging and lag compensation unit 94. Thus, the counter goes on at the beginning of the reference square wave and the count it reaches at the beginning of the variable phase square wave is stored in the latch circuit. Since the counter is driven at a rate of 10.8 kHz, it may be seen that each count represents one degree. This provides direct output reading of the phase difference between the two square waves.

In the foregoing, there has been described in detail, the construction and operation of the improved circuitry by which instabilities caused by propagation characteristics of the VORTAC signals and by excessive meter sensitivity are eliminated. It should be recognized, however, that the preferred embodiment illustrated is subject to considerable variation within the scope of the invention. For example, though the utility of the invention has been described in the context of the area mode system of the type shown in the Abnett et al patent, it should be recalled that the concepts of this invention find utility in distance mode systems such as that shown in the Bean patent, as well as in area navigation systems of other types. Indeed, because of the phase averaging and lag compensation circuits here disclosed, are so effective in eliminating the effects of VOR propagation characteristics, it would be possible to incorporate a smoother circuit of the type in question directly in a VOR receiver, e.g. as an input to the VOR converter, thereby improving the operation of a conventional VOR navigation system. Other modifications, e.g. as regarding the circuit configuration will be apparent to one skilled in the art in light of the description herein.

Thus, it should be understood that the disclosed embodiment is in all respects representative, and the actual scope of the invention is defined by the attached claims.

We claim:

1. An area navigation system comprising: first means for receiving station-to-aircraft vector angle signals; processing means including averaging means coupled to said first receiving means for averaging said vector signals, and lag compensation means coupled to said averaging means, said lag compensation means, including means responsive to the amount of phase lag introduced by said averaging means for adjusting the degree of lag compensation; second means for receiving station-to-aircraft magnitude signals; a waypoint-to-aircraft vector computer having said signals from said processing means and said second receiving means coupled thereto; a station-to-waypoint vector generator, also coupled to said computer, to produce an electrical output signal representative of the corresponding waypoint-to-aircraft vector; and means coupled to said computer output signal for developing a display of the value of said aircraft-to-waypoint vector.

2. Apparatus as defined in claim 1 wherein said station-to-aircraft vector angle signal is a periodic variable phase electrical signal; and wherein said processing means includes means to develop a periodic phase reference signal, means to generate a voltage analog of the aircraft-to-station vector phase angle relative to said reference phase, means coupling said voltage analog as an input to said averaging circuit, and means coupled to the output of said lag compensation circuit to generate a periodic output signal having a phase equal to the average value of said variable phase signal relative to said reference phase.

3. Apparatus as defined in claim 2 further including limit sensing means defining an acceptable range for said voltage analog and means responsive to said voltage being outside the acceptable range to effect a predetermined phase shift of said phase reference signal.

4. Apparatus as defined in claim 2 wherein said voltage analog generator comprises means for sensing a predetermined phase angle of said variable phase signal, and sample and hold means responsive to said predetermined phase to sample and store the value of said reference phase signal at that time.

5. Apparatus as defined in claim 4 wherein said variable phase signal is in the form of a square wave, and wherein said sample and hold means is responsive to the high to low transition of each square wave cycle.

6. Apparatus as defined in claim 5 wherein said reference phase signal is a ramp at the same frequency as said variable phase signal.

7. Apparatus as defined in claim 6 wherein said stationto-aircraft vector angle information includes a first periodic signal component of fixed frequency and constant phase, and a second periodic signal component of the same frequency, and of variable phase relative to said first component, means responsive to said first component to generate a first clock signal at said fixed frequency; and wherein said means for generating said reference ramp comprises a DC signal source, means to integrate said DC signal, means to reset said integrator, and means responsive to a predetermined phase angle of each cycle of said first clock signal to operate said integrator reset means.

8. Apparatus as defined in claim 7 wherein said first clock signal is a square wave, and wherein said means for operating said integrator reset means is responsive to a level transition of said clock square wave.

9. Apparatus as defined in claim 8 further including means to select which of said square wave level transitions operates said integrator reset means.

10. Apparatus as defined in claim 9 wherein said transition selection means comprises means to establish a particular transition to reset said integrator, limit sensing means for establishing an acceptable range for said voltage analog signal, and means responsive to said voltage analog signal being outside the acceptable range for changing the transition on which the ramp is reset.

11. Apparatus as defined in claim 7 further including limit sensing means for establishing an acceptable range for said phase angle voltage analog, and means responsive to said voltage analog being outside the acceptable range for changing the predetermined phase angle at which said integrator reset means is operated.

12. Apparatus as defined in claim 11 wherein said integrator reset phase angle is changed by 180°.

13. Apparatus as defined in claim 7 wherein said means for generating said periodic output signal comprises means for comparing the output of said lag compensation circuit with said ramp signal to generate a pulse signal having a transition representative of the time that the two signals are equal, and means responsive to said transition for generating a periodic signal having the same frequency as said first clock signal, and having its zero phase coincident with said transition.

14. Apparatus as defined in claim 13 wherein said means for generating said output periodic signal comprises a counter, means for resetting said counter coincident with said transition, means for driving said counter at a second clock frequency such that a predetermined number of counts equals the period of said first clock signal, and means responsive to half said predetermined number of counts for turning off said counter.

15. Apparatus as defined in claim 2 wherein said averaging circuit comprises a low pass filter having a time constant in excess of about 10 seconds.

16. In an area navigation system comprising; first means for receiving station-to-aircraft vector angle signals; second means for receiving station-to-aircraft magnitude signals; a waypoint-to-aircraft vector computer having said signals from said second receiving means coupled thereto; a station-to-waypoint vector generator, also coupled to said computer, to produce an electrical signal representative of the corresponding waypoint-to-aircraft vector; the improvement comprising: a distance generator coupled to the output of said computer for developing a distance display signal, an angle generator coupled to the output of said computer for developing an angle display signal, a meter for displaying said angle and deviation from a selected track to waypoint signal, and sensitivity adjustment means responsive to said distance signal for reducing the sensitivity of said meter as said distance signal becomes smaller.

17. Apparatus as defined in claim 16 wherein said sensitivity control means includes means for establishing a threshold value for said difference signal, means for establishing a normal meter sensitivity, and means responsive to said distance signal being less than said threshold level for reducing said meter sensitivity below its normal level.

18. Apparatus as defined in claim 16 including digital display means, and means for selectively coupling said distance signal and said angle signal to said display means.

* * * * *